March 26, 1957     R. W. HEWES ET AL     2,786,904

CONTROL SWITCH FOR RAILWAY TRAFFIC CONTROLLING SYSTEMS

Filed May 13, 1954     3 Sheets-Sheet 1

*INVENTORS*
*R. W. HEWES AND*
*I. A. DE KRAMER*
BY
*Forest B. Hitchcock*
THEIR ATTORNEY March 26, 1957  R. W. HEWES ET AL  2,786,904
CONTROL SWITCH FOR RAILWAY TRAFFIC CONTROLLING SYSTEMS
Filed May 13, 1954  3 Sheets-Sheet 2

*INVENTORS*
*R. W. HEWES AND*
*I. A. DE KRAMER*
BY
Forest B. Hitchcock
THEIR ATTORNEY March 26, 1957  R. W. HEWES ET AL  2,786,904
CONTROL SWITCH FOR RAILWAY TRAFFIC CONTROLLING SYSTEMS
Filed May 13, 1954  3 Sheets-Sheet 3
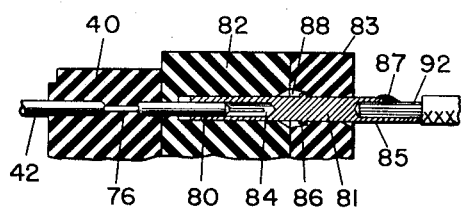
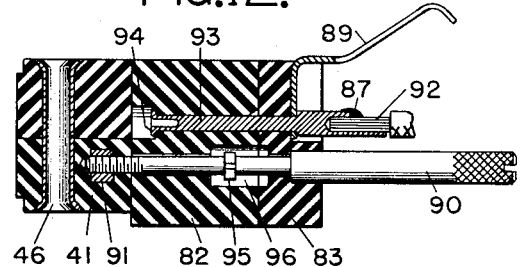
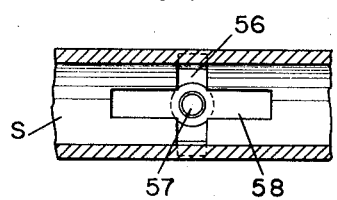
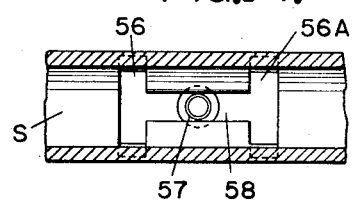
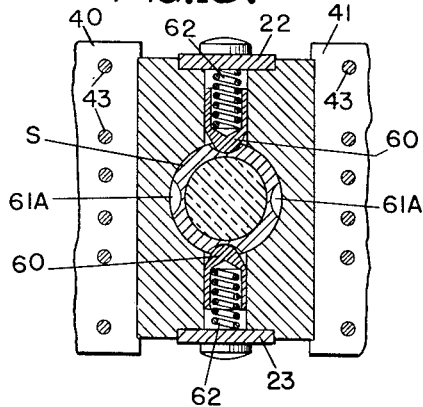
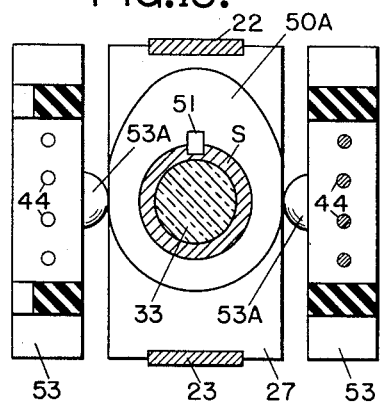
INVENTORS
R.W. HEWES AND
I.A. DE KRAMER
BY
Forest B. Hitchcock
THEIR ATTORNEY United States Patent Office 2,786,904
Patented Mar. 26, 1957

2,786,904

CONTROL SWITCH FOR RAILWAY TRAFFIC CONTROLLING SYSTEMS

Ralph W. Hewes, Rochester, and Isaac A. De Kramer, Churchville, N. Y., assignors to General Railway Signal Company, Rochester, N. Y.

Application May 13, 1954, Serial No. 429,470

13 Claims. (Cl. 200—4)

This invention relates to manual control switches, and more particularly to a multiple position switch or contactor which may be manually moved from its normal position to any one of several other selected positions.

In railway traffic controlling systems wherein the control switches are associated with track layouts engraved on a control panel in the dispatcher control tower, it is desirable to have a single control switch capable of selecting different optional control circuits for setting up a train route through a particular interlocking plant which may comprise a yard and several track sections, as well as provide indications showing that the controlled apparatus has responded to the operation of the control switch.

One object of the invention is to provide a multiple position control switch which combines the four most common switch movements, namely, push, pull, turn right and turn left with a simple wire type contact structure.

Another object of the invention is to provide a control switch assembly having relay type wipe contacts for better performance and still be able to confine the apparatus within certain dimensional limitations necessitated by the limited mounting space available on track diagram panels.

A still further object of the invention is to provide an assembly designed for flexibility so that different types of contact arrangements and operational features can be utilized. Also, the device is assembled to make it readily adaptable to the use of a plug coupling device to facilitate external wiring connections to both the control switch and indication lamps.

A still further object of the invention is a switch construction which readily allows modifications to be made in its rotary movements, such as a change from a 45° movement to a 90° movement or both, or such as incorporating a push or a pull movement with a rotary movement to complete one function.

Other objects, purposes and characteristic features of the invention will be apparent and pointed out as the description of the invention progresses and reference will be made to the accompanying drawings wherein like parts are referred to by like reference characters and in which:

Figs. 11 and 12 are enlarged sectional views of parts of the plug coupler as already shown in Fig. 2;

Fig. 13 is an enlarged sectional plan view of a part of the operating shaft showing the slot and guide pin operational arrangement as already shown in Figs. 2 and 5;

Fig. 14 is an enlarged sectional plan view of a part of the operating shaft showing a modified form of the slot and guide pin operational arrangement; and Figs. 15 and 16 show a modified cam and detent arrangement as distinguished from Figs. 8 and 6.

Figure 1:
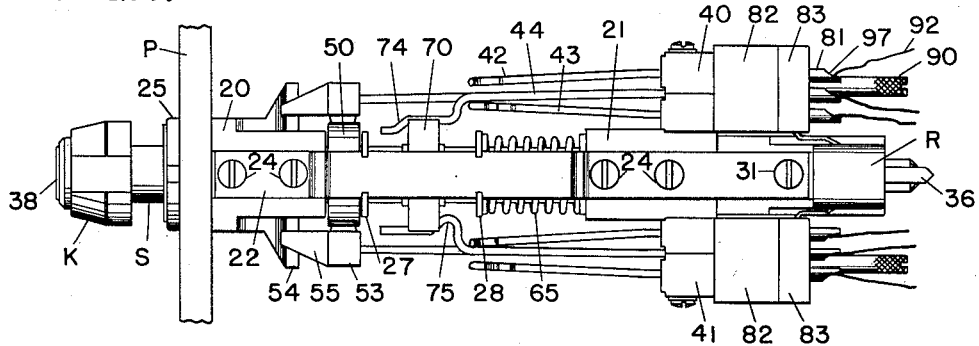
Fig. 1 is a plan view of the control switch shown mounted on a control panel and plug coupled to external wires.

Several of the above sectional views have been shown with certain parts in the background being removed or broken away for the sake of clearness.

Referring now more particularly to Figs. 1 to 4 inclusive of the drawings, the control switch housing comprises a metal frame work consisting of a front bearing block 20, a rear bearing block 21 and two connecting straps 22 and 23 are fastened to the front and rear bearing blocks 20 and 21 by means of screws 24. The front bearing block 20 is cylindrical shaped and threaded on one end and passes through a hole in the panel P. The control switch is mounted from the rear of the panel P. A spanner nut 25 is threaded onto the bearing block 20 and clamps the control switch in place on the panel P. A key 26 on the bearing block 20 fits into a keyway in the panel P to prevent turning of the switch assembly in the panel P.

Figure 6:
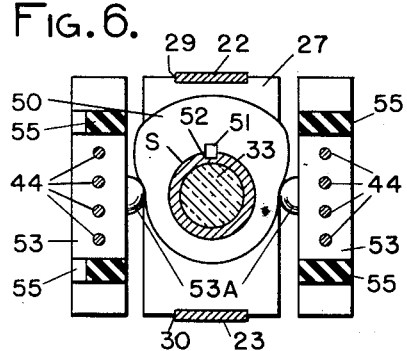
Fig. 6 is an enlarged sectional view taken on the line 6—6 of Fig. 2.

Two frame cross members 27 and 28 are placed between the two straps 22 and 23 during assembly and are held in place by suitable tongue and groove construction as shown at 29 and 30 (see Fig. 6). The two frame connecting straps 22 and 23 are long enough to serve as a mounting for a lamp receptacle R which is located at the rear of the control switch between these two straps and held in place by screws 31.

A hollow shaft S is mounted within the two bearing blocks 20 and 21 and extends from the front of the panel P to the rear of the control switch, through holes in the cross members 27 and 28, ending in front of the lamp receptacle R. This operating shaft S is mounted so that it may be pushed, pulled, turned right or turned left to operate certain selected contact members and this construction, as well as the position locking means, will be fully explained hereinafter. A control knob K is fastened to the front end of the shaft S by means of a set screw 32 to facilitate operation of the shaft S.

A translucent light transmitting rod 33 made of "Lucite" or other suitable light conducting transparent material is located within the hollow shaft S and extends from the control knob K to the lamp receptacle R. This translucent rod 33 is held in place by friction caused by an arched spring 34 which lies in a groove 35 in the rod 33, the spring 34 bearing against the inside surface of the shaft S and the bottom of the groove 35. The lamp receptacle R is divided into two compartments, each compartment being provided with a lamp 36 and a colored glass 37. The front end of the translucent rod is provided with a glass bull's eye 38 which slides within the control knob K and clamps onto a reduced portion 39 of the translucent rod 33. This construction permits light to be transmitted from the lamp 36 to the bull's eye 38 by means of the translucent rod 33.

The rear bearing block 21 is also used as a means for supporting the insulated contact carrying blocks 40 and 41. These blocks 40 and 41 are preferably each made of two pieces, the stationary contact members 42 being molded into the outer half and the stationary contact members 43 being molded into the inner half. The movable contact members 44 are inserted into V shaped notches 45 provided in the inner faces of the blocks (see Fig. 8) and are clamped into place when the two halves of the blocks 40 and 41 are fastened together, as by the hollow rivets 46 (see Fig. 2). The entire block assemblies are then fastened to the bearing block 21 by means of screws 47. It is obvious that the hollow rivets 46 may be eliminated if desired, the screws 47 being capable of holding the two-piece blocks together as well as providing the means by which they are fastened to the bearing block 21. This method would allow the movable contact members 44 to be changed simply by loosening the screws 47 and making a replacement, the screws 47 then being tightened down again.

Figure 10:
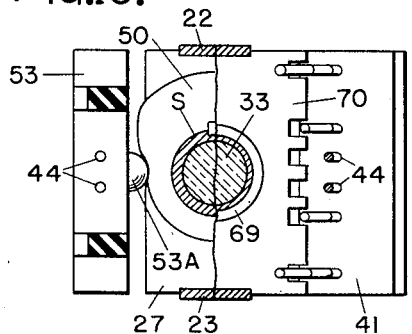
Fig. 10 is an enlarged composite sectional view similar to Figs. 6 and 7 but showing a modification in contact assembly and operation.

In the illustrations shown, each contact block 40 and 41 has a complement of six contact finger assemblies, the two end assemblies cooperating with the push-pull movements of the shaft S while the four center assemblies cooperate with the rotary movements of the shaft S. Other variations of assemblies are possible and it should be understood that the switches can be assembled in accordance with requirements. As an example, Fig. 10 shows one variation in which the two center contact assemblies only are operated by a rotary movement while all others are operated by push or pull movements.

In the illustrations thus far shown and described, the contact fingers 42, 43 and 44 are assumed to be made from round stock of spring Phosphor bronze wire, suitably silver plated to provide a good non-corrosive and non-burning contact surface when used under heavy current load conditions. It should, however, be understood that other contact material and other shapes and sizes may be used in accordance with the operating conditions encountered.

At the points 76 where these contact fingers are either clamped or molded in the two halves of the insulating blocks 40 and 41, the contact fingers are flattened to provide better holding means (see Fig. 11). At the free ends of the stationary contact fingers 42 and 43 where contact is made with the movable contact fingers 44, special provision is made to insure a good contact between the two elements. As viewed in Fig. 3, the ends of these stationary contact fingers 42 and 43 are bent to form a hook or angle portion 77 so that the extreme ends can be bent slightly inward toward the movable contact fingers 44. This insures a good one point contact between the two contact fingers and provides a means for obtaining the desired contact pressure merely by regulating the amount of bend.

Referring now to the control knob K and its associated operating shaft S as shown in Figs. 1 to 9 and 13 of the drawings, the assembly illustrated is adapted to have a normal position (as shown) and four operating positions as determined by a push movement, a pull movement, a turn right movement and a turn left movement. In each operated position different sets of contacts will be conditioned, each operation requiring that the operating shaft S be returned to normal before another position is selected.

Figure 5:
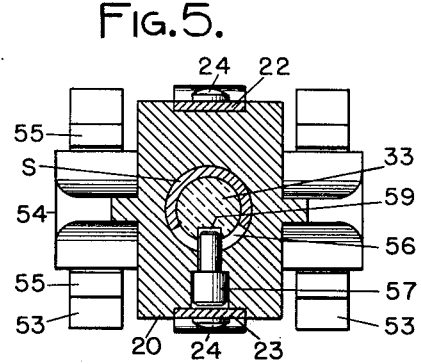
Fig. 5 is an enlarged sectional view taken on the line 5—5 of Fig. 2.
Figure 8:
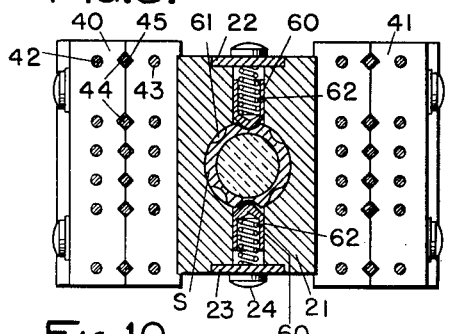
Fig. 8 is an enlarged sectional view taken on the line 8—8 of Fig. 2.
Figure 9:
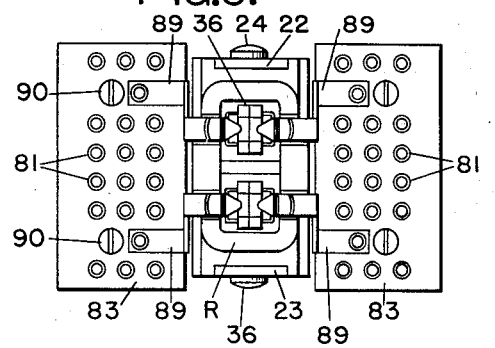
Fig. 9 is an enlarged end view showing the plug coupler arrangement.

Let us first consider the rotary movement positions of the operating shaft S. As shown in Figs. 5, 6 and 8, there has been selected a 45° rotary movement, either right or left, to operate certain contact assemblies 42—43—44, in this particular instance the four center contact assemblies being chosen. A suitably shaped cam member 50 formed of insulating material and designed for a 45° shaft movement is shown keyed to the operating shaft S by a key 51. The keyway 52 in the shaft is enlarged lengthwise to allow endwise movement of the shaft S for reasons explained hereinafter. The cam member 50 is located to cooperate with insulated blocks 53 when the operating shaft S is rotated, the cam member 50 actually bearing against rounded bosses 53A molded on the insulated blocks 53. These insulated blocks 53 are molded around the free ends of certain of the movable contact fingers 44. The insulated blocks 53 are guided by lugs 54 formed on the bearing block 20 and lugs 55 formed on the blocks 53, this arrangement preventing side movement of the blocks 53 when forced outward by the cam member 50.

The 45° rotary movement of the shaft S in either direction is limited by a circumferential slot 56 in the shaft S (see Figs. 5 and 13) and a shouldered pin 57 which is mounted in the bearing block 20 and held in place by the frame strap 23. The small end of the pin 57 extends through the circumferential slot 56 and acts as a guide and stop. It should also be noted that the shaft S is provided with a longitudinal slot 58 at the point where the pin 57 passes through the shaft S to permit lengthwise movement of the shaft for reasons explained hereinafter. A longitudinal clearance groove 59 is cut into the translucent rod 33 surrounding the guide pin 57 to allow lengthwise movement of the translucent rod 33. The shaft S is held in its rotary positions by a pair of spring pressed detent members 60 which cooperate with elongated grooves 61 in the shaft S (see Fig. 8). These detent members 60 are actuated by springs 62 which are held in place by the frame straps 22 and 23.

Let us now consider the push and pull movement positions of the operating shaft S. The normal position of the shaft S as far as lengthwise movement is concerned is fixed by a centering coil spring 65 which is located on the shaft between the frame cross member 28 and the rear bearing block 21. This spring 65 is retained between retaining washers 66 and 67 which are limited in outward movement by split rings 68L and 68R which are sprung into grooves in the shaft S. Upon a pull movement of the shaft S the retaining washer 66 bears against the cross frame member 28 and the spring 65 is compressed as the retaining washer 67 and split ring 68R follows the movement of the shaft S. Likewise, upon a push movement of the shaft S the retaining washer 67 bears against the rear bearing 21 and the spring 65 is compressed as the retaining washer 66 and split ring 68L follows the movement of the shaft S. Upon release of the control knob K after either kind of a movement, the compressed spring 65 will return the shaft S to its normal position.

Figure 7:
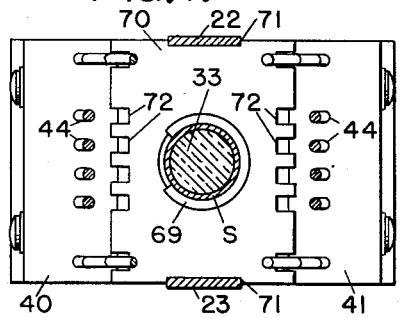
Fig. 7 is an enlarged sectional view taken on the line 7—7 of Fig. 2.

Also, loosely mounted on the shaft and fixed thereto by split rings 69, as far as lengthwise movement is concerned, is a cam member 70 which controls the movable contact fingers 44 which are associated with the contact assemblies operated by push and pull movements of the shaft S. This cam member 70 is grooved as shown at 71 on both top and bottom sides to fit around the frame strap members 22 and 23, as shown in Fig. 7. This construction prevents the cam member 70 from turning but allows a sliding movement along the frame members 22 and 23 when the shaft S is moved lengthwise.

Both the right and left sides of this cam member 70 are provided with grooves 72 which form guides for certain of the movable contact fingers 44. The bottom surfaces of these grooves 72 are shaped to form cam surfaces 73 which cooperate with cam surfaces 74 or 75 or both which are formed by bending the wire ends of certain of the movable contact fingers 44. As shown in Fig. 1, to operate a contact assembly by a pull movement of the shaft S, the cam portion of the movable contact finger 44 would be shaped as shown at 74, whereby a pull movement would force the movable contact finger 44 upward, thus breaking contact between fingers 44 and 43 and making contact between fingers 44 and 42.

Figure 2:
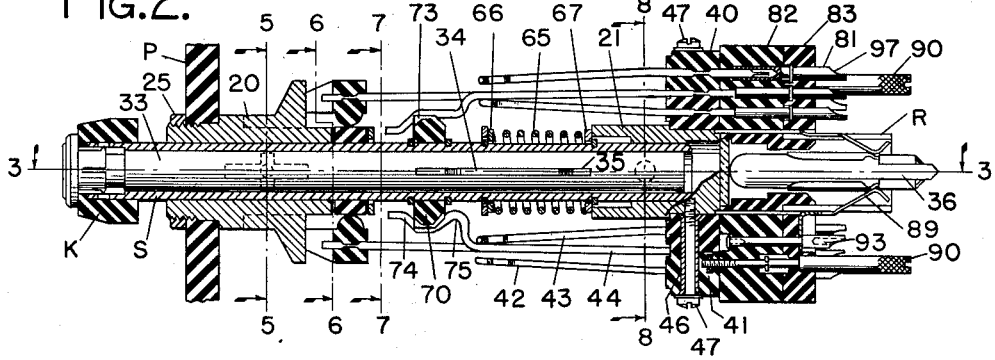
Fig. 2 is a sectional plan view of the apparatus shown in Fig. 1.
Figure 3:
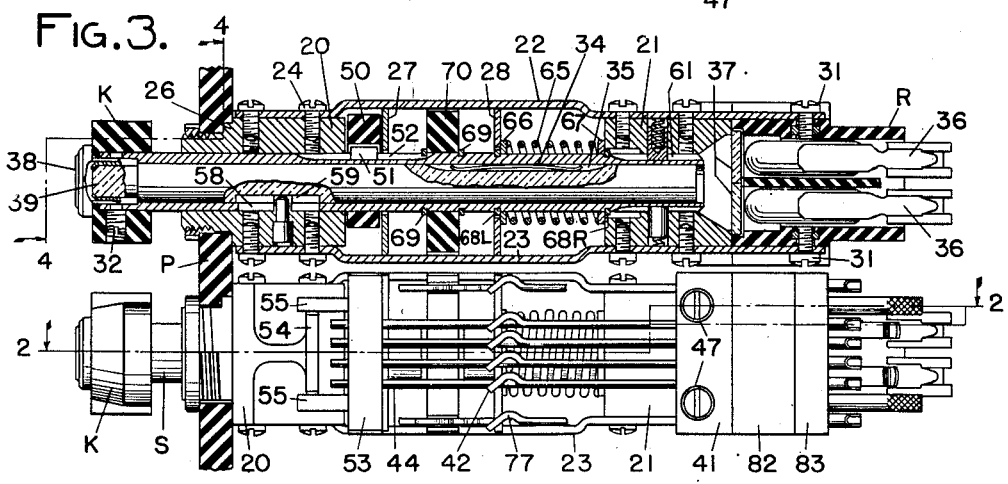
Fig. 3 is a side elevation and sectional view of the apparatus shown in Fig. 1, and also shows the relationship of two mounted units.
Figure 4:
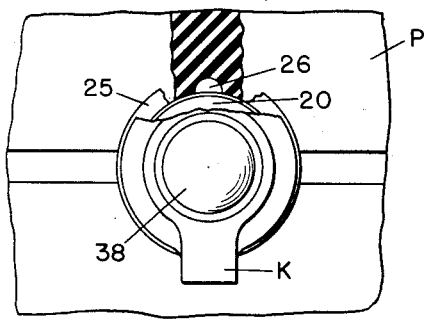
Fig. 4 is a front view partially broken away to show the control knob and panel fastening means and track layout.

Similarly where it is desired to operate a contact assembly by a push movement of the shaft S, the cam portion of the movable contact finger 44 would be shaped as shown at 75. When it is desired to operate one certain contact assembly by both a push and a pull movement of the operating shaft S, the shape of the cam portion of the movable contact finger 44 is formed to combine both of the cam humps 74 and 75 as shown in Fig. 2.

With reference to the foregoing description and drawings, it is believed a brief description of the operation of the control switch will suffice. When the control knob K is rotated to a right-hand 45° position, the cam member 50 will force the right-hand block 53 outward away from the center of the control switch (see Fig. 6). As this block 53 carries the movable contact fingers 44 for the four right-hand center contact assemblies, these contact assemblies will change positions, the movable contact fingers breaking contact with stationary contact fingers 43 and making contact with stationary contact fingers 42. During this movement, the circumferential slot 56 (see Fig. 5) in the shaft S has shifted to the left on the guide and stop pin 57 and the shaft S has come to rest with the right-hand end of the slot 56 against the stop pin 57. Also, the spring pressed detents 60 now rest in the 45° grooves 61 instead of the center normal position grooves 61, where they will hold the shaft S until manually removed.

When the newly established circuit has completed its function, the control switch may be restored to normal by rotating the knob K back to its normal center position, where it again will be held by the detents 60. In this connection, it should be mentioned that the movable contact fingers 44 are normally biased against the stationary contact fingers 43 so that when the control knob K is moved back to its normal center position, the block 53 follows the movement of the cam member 50.

It should be obvious that a left-hand rotary movement of the control knob K will perform a similar function except that this time the cam member 50 will move the left-hand block 53 and its associated movable contact fingers 44, the right-hand block 53 remaining stationary.

As previously described, the operating shaft S is held in its normal position against lengthwise movement by the centering spring 65. When the control knob K is pushed inwardly toward the control panel P the shaft S and its associated cam member 70 move to operate certain of the movable contact fingers 44. In the particular illustration of contact combinations shown and already referred to, this would be the upper and lower right-hand contact assemblies as viewed in Figs. 1, 2 and 7. The contact finger shift takes place when the cam surfaces 73 on the cam member 70 engage the cam surfaces 75 on the movable contact fingers 44, thus forcing the movable contact fingers 44 outward causing a break with stationary contact finger 43 and a make with stationary contact finger 42.

Also, the centering spring 65 is compressed as retaining washer 66 and split ring 68L move with the shaft S while retaining washer 67 is held against the bearing block 21. The control knob K and the shaft S and associated cam and contacts will remain in this operated position only so long as held, all parts being returned to normal as soon as the control knob K is released, by action of the compressed spring 65.

A pull movement of the control knob K will also move the cam member 70, this time to a forward position, wherein the cam surfaces 73 of the cam member 70 will engage all movable contact fingers 44 having a cam surface 74. Likewise, the spring 65 will again be compressed, this time the retaining washer 67 and split ring 68R moving with the shaft S while the retaining washer 66 is held against movement by the cross frame member 28. Upon release of the control knob K, the compressed spring 65 will return all parts to the normal center position.

Referring now to the previous description in connection with the rotary movements of the control switch, it was mentioned that the various keyways, slots and grooves, such as 52, 58 and 61 in the shaft S were made large lengthwise. It can now be understood that this is necessary to permit endwise movement of the shaft S when making the push and pull contact operating movements. It should also be understood that this structure of assembly prohibits a rotary movement of the shaft S while in an operated push or pull position, because the circumferential slot 56 will not line up with the guide pin 57. Also, a push or pull movement of the shaft S cannot take place while in an operated rotated position as the guide pin 57 will be positioned in the circumferential slot 56.

The plug coupling devices previously mentioned are best shown in Figs. 1, 2, 3 and 9. The contact carrying blocks 40 and 41 are mounted, one on either side of the bearing block 21 and each have a plug coupler unit attached thereto. As these plug coupler units are alike except for the fact that they are built right and left handed, it will only be necessary to describe one in detail. The contact blocks 40 and 41 are so constructed that when the contact fingers 42, 43 and 44 are either molded or clamped therein, a portion of each of the contact fingers is left protruding from the rear surface of the blocks. These contact ends 80 are pointed to facilitate their entrance into the plug coupler receptacles 81.

The plug coupler units are preferably comprised of two pieces of insulating block 82 and 83 which house the receptacles 81 in a manner to be explained and shown in detail in Fig. 11. Each receptacle 81 is tubular in shape at both ends 84 and 85 and has an enlarged center section or hub 86. The end 84 which cooperates with the contact ends 80 is split and squeezed together so that a good contact is made between the two units. The other end 85 is slightly bevelled as shown at 97 to provide an open space so that when the wire 92 is inserted therein it may easily be soldered in place, as shown at 87. The block 82 is provided with holes to receive the receptacles 81. The block 83 is also provided with receptacle holes and has an enlarged bore 88 at its inner surface to receive the enlarged hub 86 of the receptacle 81. When the two blocks 82 and 83 are fastened together, it can be seen that the receptacles 81 are loosely held in place within the blocks but they may float to a certain extent to allow for misalignment.

These blocks 82 and 83 are fastened together by two combination rivets and receptacles 93 which also anchor two spring contacts 89 which cooperate with the contacts of lamps 36 housed in the lamp receptacle R, thus providing a plug coupling means for the lamps 36. As more clearly shown in Fig. 12, these combination rivet receptacles 93 are formed with a small end and a large end, the small end passing through holes in the contact spring 89 and the blocks 82 and 83. When the small end is riveted over, as shown at 94, the parts are all held securely together. The large end of the rivet receptacles 93 are provided with the usual holes to facilitate soldered wire connections, the same as the receptacles 81. The plug coupler units are each assembled with their receptacles 81 placed therein in off-center positions with respect to the centerline of the blocks 82 and 83, making them right and left handed with respect to each other. This type of assembly will prevent wrong coupling of circuits if the plug coupler units are inadvertently turned 180° when an attempt is made to plug couple them to their respective contact banks. Also it will prevent wrong coupling if an attempt is made to reverse the right and left hand positions of the two plug coupler units. Knurled screws 90 are provided to fasten the plug coupler units in place once the correct connections have been made. These screws 90, as shown in Fig. 12, are provided with split rings 95 to form a hub thereon. This hub portion lies within an enlarged bore 96 in the blocks 82 and 83 when assembled. The enlarged bore 96 provides endwise movement for the screw 90 so that the screws 90 may be threaded into or out of the metal inserts 91 located in the contact blocks 40 and 41.

From the foregoing description and with reference to the drawings, it can be seen that a plug coupling means has been provided which eliminates the possibilities of wrong coupling and one which can be securely locked in place while in service. Also, the provision of a plug coupling unit on both sides of the lamp receptacle R provides a means to plug couple the lamp circuits, these circuits being broken if either one of the plug couplers is removed. Also, the lamps 36 can be replaced without removing the plug coupler units.

In some instances, in accordance with requirements, it may be desirable to modify the control switch to perform different functions, such as for example, to combine a rotary movement with a push or a pull movement, and have the control switch remain in its operated push or pull position, as well as its rotated position, until manually released by positioning the control knob K in its center position. This can be done by merely changing the design of the guide slots 56 and 58 in the operating shaft S.

In Fig. 13, there has been shown a sectional plan view of the shaft S with the guide pin 57 in place in the guide slots 56 and 58, which slots are formed in accordance with the form of the invention already described. In this form, it can be seen that a push or a pull movement will leave the switch in a position where it will be returned automatically to normal by the centering spring 65 upon release of the control knob K. In the design shown in Fig. 14, the guide slots have been changed from a general "cross" shape to an H shape, the longitudinal slot 58 remaining the same and two arcuate slots 56 and 56A being substituted for the one arcuate slot 56. It can now be seen that the control switch can be either pushed or pulled, then turned either right or left, completing two functions as far as contact operation is concerned. If left in a rotated position, it would remain that way as the detent device 60 holds the rotated position of the shaft S and the guide stop pin 57 will be positioned either in slot 56 or 56A, thus preventing the compressed spring 65 from returning the shaft S to a normal position. The control knob K must be rotated to its center position before the spring 65 can return the shaft S to its normal position. It should be obvious that any other combination of slots 56 and 58 could be used to create other operating conditions.

Figs. 15 and 16 show another combination of rotary movement which may be used. Merely by changing the shape of the cam 50A as shown and also change the position of the detent grooves as shown at 61A, the control switch can be made to operate on a 90° rotary movement of the shaft instead of a 45° movement. Obviously, if both 45° and 90° rotary movements are required, either two separate cams 50 and 50A could be used or a new cam could be designed to provide the necessary movements, the contact assembly combinations being arranged accordingly.

It is believed that the invention provides a control switch which is compact in design, very economical to manufacture and one that lends itself to various modifications. These modifications, when required, can be made with a minimum of replacement parts and very little change in assembly. Also, it is easily accessible to facilitate plug coupling all wiring connections to an external source.

Having described one main form which the invention may assume as well as several minor modifications, it should be understood that various other adaptations and designs could be used without departing from the spirit of the invention or scope of the appending claims.

What we claim is:

1. A control switch of the multiple position type comprising, a housing having a front and a rear bearing block with contacting strips therebetween, an operating shaft slidably and rotatably mounted in said bearing blocks and having a control knob secured thereto, contact banks secured to opposite sides of said rear bearing block, each of the contact banks having contact fingers extending substantially parallel to said operating shaft, a rotary cam for operating certain of said contact banks, said cam being slidable on said shaft axially but keyed to said shaft in a manner to be rotated in accordance with the rotation of said shaft, means for preventing axial movement of said rotary cam when said shaft is operated axially, a sliding cam connected to said shaft so as to be operated axially in accordance with the axial actuation of said shaft, said cam cooperating with certain other of said contact banks when said control knob is actuated axially, and limiting means associated with said operating shaft for governing the extent of its rotary and axial movement.

2. A multiple position control switch comprising, a frame work having two bearing blocks, two connecting strips and two cross members, a shaft extending through said bearing blocks and said cross members, a centering spring for retaining said shaft in an axial neutral position and a spring biased detent for retaining said shaft in a radial position, a control knob fastened to said shaft, a rotary cam slidable axially on said shaft but keyed to said shaft to provide rotary movement and a sliding cam secured to said shaft and subject to axial movement in accordance with the axial movement of said shaft, means for preventing axial movement of said rotary cam when said shaft is operated axially, axial and radial slots in said shaft, a stop and a guide pin mounted in one of said bearing blocks in a manner to cooperate with said slots in said shaft, contact banks on said other bearing blocks having contacting fingers extending substantially parallel to said shaft and subject to actuation selectively by said rotary and sliding cams respectively, whereby said control knob may be rotated in either direction or pushed or pulled from its normal position to operate respective selected contact banks.

3. A multiple position control switch comprising, a framework having two bearing blocks, two connecting straps and two cross members, a shaft extending through said bearing blocks and said cross members, a rotary cam keyed to an elongated keyway in said shaft and held against horizontal movement by the first of said bearing blocks and the first of said cross members, a sliding cam actuated horizontally by said shaft and held against rotary movement by said connecting straps, a centering coil spring around said shaft and positioned within retaining washers and split rings located on said shaft between the second of said cross members and the second of said bearing blocks, spring pressed detents located in said second bearing block and cooperating with elongated grooves in said shaft, a stop and guide pin located in said first bearing block and cooperating with circumferential slots and horizontal slots in said shaft, contact banks fastened to opposite sides of said second bearing block and lying in a plane substantially parallel to said shaft, said contact banks having biased intermediate contact fingers cooperating with either the said rotary cam or the said sliding cam, a control knob fastened to one end of said shaft, whereby, rotary movements of said control knob either right or left will rotate said shaft and said rotary cam within the limits of said circumferential slots and cause operation of certain of said contact banks, said shaft turning freely through said horizontal cam, and whereby push or pull movements of said control knob will move said shaft and said sliding cam on a horizontal plane within the limits of said horizontal slots and cause operation of certain other of said contact banks, said shaft moving freely through said rotary cam, said shaft being held by said spring pressed detents in its rotary positions and being returned to normal by said centering spring after horizontal movements.

4. A multiple position control switch comprising, a housing having a front and a rear bearing block fastened together by connecting straps, an operating shaft slidably and turnably mounted in said bearing blocks, said operating shaft having a control knob fastened thereto and a rotary cam and a sliding cam each associated therewith, contact banks fastened to opposite sides of said rear bearing block, said contact banks having contact finger groups of round bronze wire extending lengthwise substantially parallel to said operating shaft, each of said contact finger groups comprising a front contact, a back contact and a biased movable contact, said front contacts being fastened in one insulation block and said back contacts being fastened in another insulation block, said biased movable contacts having one end clamped between said two insulation blocks which are fastened together by screws or rivets, certain of said biased movable contacts being bent to form cam surfaces on their other end thereof which are biased toward and cooperate with grooves and cam faces on said sliding cam, certain other of said biased movable contacts having their other end molded into a cam follower block causing it to be biased against said rotary cam, said cam follower blocks having guide lugs thereon which cooperate with a guide lug on said first bearing block; whereby, said control knob may be rotated right and left to cause said rotary cam to operate certain of said contact finger groups and may be pushed and pulled to cause said sliding cam to operate certain other of said contact finger groups, and limit means associated with said operating shaft which requires one operating function to be completed before another operating function can be started.

5. In combination, a multiple control switch mounted on a control panel in a manner to facilitate operation from the front of the panel, a plug coupling means to facilitate external wire connecting from the rear of the panel, and a light transmitting means for transmitting a light beam from indication lamps in the rear of said panel to said front of the panel, said multiple control switch comprising a framework, a hollow shaft mounted in said framework, a control knob having a transparent insert therein, a rotary cam and a sliding cam each associated with said hollow shaft, contact banks having horizontal mounted contact fingers thereon, an indication lamp receptacle fastened to said framework, a means associated with said shaft to permit movement of said rotary cam while said sliding cam is held stationary and a means associated with said shaft to permit movement of said sliding cam while said rotary cam is held stationary, said rotary cam operating certain of said contact banks upon rotary movement of said control knob, said sliding cam operating certain of the other said contact banks upon horizontal movement of said control knob, said plug coupling means comprising receptacles and contacts which make connections between the contact fingers of said contact banks and said indication lamps and the external wires, said light transmitting means comprising a light transmitting rod located within said hollow shaft and positioned between said indication lamps in the rear of said control panel and said control knob in the front of said control panel.

6. In combination, a control switch, indication lamps, plug couplers and a control panel, said control switch comprising a housing having a front and a rear bearing block, a hollow operating shaft slidably and turnably mounted in said bearing blocks, said shaft having a control knob with a transparent insert therein fastened thereto and a rotary cam and a sliding cam each associated therewith, contact banks fastened to said rear bearing block, contact fingers of said contact banks extending substantially parallel to said operating shaft, said rotary cam operating certain of said contact banks when said control knob is rotated in one direction and with certain other contact banks when rotated in an opposite direction, said sliding cam operating certain other of said contact banks when said control knob is pushed in one direction and with certain other contact banks when pulled in an opposite direction, limit means associated with said operating shaft to govern the sequence and extent of its movements, said indication lamps being located within a lamp receptacle mounted adjacent one end of said hollow shaft, a light transmitting rod within said hollow shaft for transmitting light from said indication lamps to the other end of said hollow shaft, said plug couplers being connected to external wires and located one on each side of said lamp receptacle, said plug couplers having receptacles, contact fingers and knurled screws which cooperate with said contact banks and said indication lamps when said plug couplers are positioned and locked in place, said indication lamps being removable from said lamp receptacle and said plug coupler contact fingers, said control switch being fastened to said control panel so that said control knob is in front and said housing is in back of said control panel.

7. In combination, a control switch mounted on a control panel and adapted to be operated from the front of said control panel and plug coupled to external wires from the rear of said control panel, said plug coupled means comprising, two insulation blocks having shouldered holes therein, receptacle members having a central enlarged portion and two hollow end portions, two screw members having a central enlarged portion and one threaded end and one knurled and slotted end, said receptacle members and said screw members lying within said shouldered holes in said insulation blocks, shouldered rivets passing through both of said insulation blocks, said shouldered rivets holding said two insulation blocks together when the small ends are riveted over, the shouldered ends clamping indication lamp contacts, said receptacle members having one hollow end split to facilitate cooperation with the ends of contact fingers on said control switch and having the other hollow end cut away to facilitate receiving external wires and soldering wire connections, said screw members fastening said insulation blocks to said control switch after said plug coupled means has been positioned to cooperate with said control switch contact fingers and said indication lamps.

8. A multiple position control switch comprising, a framework having two bearing blocks, two connecting straps and two cross members, a shaft extending through said bearing blocks and said cross members, a rotary cam keyed to an elongated keyway in said shaft and held against horizontal movement by the first of said bearing blocks and the first of said cross members, a sliding cam actuated horizontally by said shaft and held against rotary movement by said connecting straps, a centering coil spring around said shaft and positioned within retaining washers and split rings located on said shaft between the second of said cross members and the second of said bearing blocks, spring pressed detents located in said second bearing block and cooperating with elongated grooves in said shaft, a stop and guide pin located in said first bearing block and cooperating with circumferential slots and a horizontal slot in said shaft, contact banks fastened to said second bearing block and positioned in a plane substantially parallel to said shaft, said contact banks having biased contact fingers cooperating either with said rotary cam or said sliding cam, a control knob fastened to one end of said shaft, whereby, horizontal and rotary movements may be combined, the push and pull movements of said control knob moving said shaft and said sliding cam on a horizontal plane within the limits of said horizontal slot and causing operation of certain of said contact banks, said shaft moving freely through said rotary cam until one of said circumferential slots lines up with said stop and guide pin, whereupon a rotary movement of said control knob will rotate said shaft and said rotary cam within the limits of said circumferential slot selected and cause operation of certain other of said contact banks, said shaft turning freely through said horizontal cam during said rotary movement and being held by said spring pressed detents after said rotary movement has been completed, thereby causing said operated contact banks to remain in operated position until manual release by operation of said control knob.

9. A multiple position control switch comprising, a framework having a front and a rear bearing block and two connecting straps fastening them together, an operating shaft extending through said two bearing blocks, a control knob fastened to said operating shaft, a rotary cam and a sliding cam each actuated by said operating shaft, contact banks mounted on opposite sides of said rear bearing block, said contact banks having several contact finger groups which are positioned substantially parallel to said operating shaft, each comprising a front contact finger, a back contact finger and a biased movable contact finger, said contact fingers each being made of round wire and flattened near one end, said flattened portion of said front contact fingers being fastened in one insulating block, said flattened portion of said back contact fingers being fastened in another insulating block and said flattened portion of said biased movable contact fingers being clamped between said two insulation blocks, the extreme end portion beyond said flattened portion of said contact fingers protruding from said insulation blocks to form the male member of a plug coupling device, the other end portion of said contact fingers forming the contact and operating means, said front and back contact fingers having said other end portions formed angle shaped with the tips bent inward toward said biased movable contact fingers to form an adjustable contact pressure point, certain of said biased movable contact fingers having said other end portions bent to form cam surfaces which cooperate with grooves and cam faces in said sliding cam and other certain of said biased movable contact fingers having their said other ends molded into a cam follower block which cooperates with said rotary cam; whereby, a push or a pull movement of said operating shaft will actuate certain of said contact groups and a rotary movement of said operating shaft will actuate certain other of said contact groups.

10. A contact finger group comprising, a front contact finger mounted in one insulating block, a back contact finger mounted in another insulating block, and a biased movable contact finger clamped between said insulation blocks, each of said contact fingers consisting of a piece of round bronze wire suitably silver plated and having a flattened portion near one end, said contact fingers being fastened into said insulation mounting blocks at their flattened portions, one above the other, one end of said contact fingers being tapered and protruding from one side of said insulation mounting block to facilitate connecting by a plug coupler to electrical conducting wires, the other protruding end of said front and back contact fingers being bent angle shaped while the other protruding end of said biased movable contact finger extends between and beyond said angle shaped ends of said front and back contact fingers to cooperate with an actuating means, said angle shaped ends being adjusted by bending to provide a correct pressure point of contact with said biased movable contact finger.

11. A contact finger combination comprising, a front contact finger mounted in one insulating block, a back contact finger mounted in another insulating block, and a movable intermediate contact finger clamped between said two insulating blocks, each made of round wire and mounted so as to be insulated from each other, each of said contact fingers having one end free and tapered to permit plug coupling connection to electrical conducting means, the other ends forming the contacting and operating means, said front and back contact fingers having their said other ends bent to form an adjustable pressure contacting point with said movable intermediate contact finger, said movable intermediate contact finger extending beyond said adjustable pressure contacting points to cooperate with an actuating means.

12. A control switch of the multiple position type having a contact finger assembly comprising, two sets of contact fingers of wire contacting material each permanently mounted in a respective insulating block, said insulating blocks each having a V-shaped groove in one face thereof, a third contact finger mounted between said two insulating blocks and their respective contact fingers and positioned within said V-shaped grooves in a manner to provide permanent mounting, rivets to securely fasten said two insulating blocks together, said first two sets of contact fingers having adjustable contact pressure points for engaging said third contact finger, said third contact finger being normally biased against one of said first contact fingers and having an extended end to provide an operating arm, said three contact fingers having their other ends tapered for facilitating connections to electrical conductors by means of plug couplers.

13. A contact finger assembly for a control switch or the like comprising, a front contact finger, a back contact finger, an intermediate contact finger and two insulating mounting blocks, said front contact finger and said back contact finger being identical, each formed of wire contacting material having a bent hook at one end, a flattened portion near its other end and a tapered portion at said other end, each of said insulating blocks surrounding the said flattened portion on its respective contact finger and having a V-shaped groove in one face thereof and holes therethrough at right angles to said V-shaped groove, said intermediate contact finger being formed of wire contacting material and having a cam operating surface at one end, a flattened portion near its other end and a tapered portion at said other end, said two insulating blocks clamping and holding said intermediate contact finger there-between when assembled with said V-shaped grooves facing each other and surrounding said flattened portion, hollow rivets through said holes for fastening the assembly together, whereby said intermediate contact finger is positioned between said front contact finger and said back contact finger and is normally biased against said bent hook end of one of said contact fingers, said bent hook ends of said front and back contact fingers providing a means of adjusting contact pressure and forming a single point contact with said intermediate contact finger, said cam operating end of said intermediate contact finger extending beyond said contact point to provide an operating arm for said intermediate contact finger and said other tapered ends of said contact fingers providing a means for connecting to external electrical conductors by means of plug couplers.

References Cited in the file of this patent

UNITED STATES PATENTS

| 913,080 | Wenam | Feb. 23, 1909 |
| 1,110,027 | Aitken | Sept. 8, 1914 |
| 1,521,591 | Beck | Jan. 6, 1925 |
| 2,149,226 | Merkel | Feb. 28, 1939 |
| 2,253,335 | Krantz | Aug. 19, 1941 |
| 2,305,185 | Merkel | Dec. 15, 1942 |
| 2,400,952 | Riebe | May 28, 1946 |
| 2,548,103 | French | Apr. 10, 1951 |
| 2,668,200 | Glaze | Feb. 2, 1954 |
| 2,669,611 | Silvius | Feb. 16, 1954 |

FOREIGN PATENTS

| 623,694 | Great Britain | May 20, 1949 |